United States Patent
Kleiman

(10) Patent No.: US 7,330,904 B1
(45) Date of Patent: Feb. 12, 2008

(54) COMMUNICATION OF CONTROL INFORMATION AND DATA IN CLIENT/SERVER SYSTEMS

(75) Inventor: Steven R. Kleiman, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 445 days.

(21) Appl. No.: 09/590,027

(22) Filed: Jun. 7, 2000

(51) Int. Cl.
*G06F 15/173* (2006.01)
*G06F 15/16* (2006.01)
*G06F 3/00* (2006.01)
*G06F 13/36* (2006.01)

(52) U.S. Cl. .................. 709/238; 709/203; 709/245; 710/56; 710/310

(58) Field of Classification Search ........... 709/203, 709/212, 228, 238, 104, 214, 234, 213, 232, 709/245; 711/120, 141, 153, 171; 710/308, 710/56, 310, 52–53
See application file for complete search history.

(56) References Cited

U.S. PATENT DOCUMENTS

| | | | |
|---|---|---|---|
| 4,937,763 A | | 6/1990 | Mott ......................... 364/550 |
| 5,067,099 A | | 11/1991 | McCown et al. .......... 364/550 |
| 5,899,994 A | * | 5/1999 | Mohamed et al. .......... 707/100 |
| 5,928,339 A | * | 7/1999 | Nishikawa .................. 711/147 |
| 6,014,695 A | * | 1/2000 | Yamashita et al. ......... 709/219 |
| 6,026,448 A | * | 2/2000 | Goldrian et al. ........... 709/212 |
| 6,075,938 A | * | 6/2000 | Bugnion et al. ............ 709/214 |
| 6,134,607 A | * | 10/2000 | Frink .......................... 710/22 |
| 6,141,692 A | * | 10/2000 | Loewenstein et al. ...... 709/234 |
| 6,243,794 B1 | * | 6/2001 | Casamatta ................... 711/153 |
| 6,247,041 B1 | * | 6/2001 | Krueger et al. ............. 709/104 |
| 6,275,900 B1 | * | 8/2001 | Liberty ........................ 711/120 |
| 6,351,784 B1 | * | 2/2002 | Neal et al. .................. 710/308 |
| 6,415,361 B1 | * | 7/2002 | Moh et al. ................... 711/141 |
| 6,499,028 B1 | * | 12/2002 | Brock et al. ................ 709/249 |
| 6,606,684 B1 | * | 8/2003 | Ramagopal et al. ........ 711/118 |
| 6,636,927 B1 | * | 10/2003 | Peters et al. ................ 710/309 |
| 6,658,469 B1 | * | 12/2003 | Massa et al. ............... 709/224 |
| 6,714,986 B2 | * | 3/2004 | Karibe et al. ............... 709/240 |
| 2002/0013821 A1 | * | 1/2002 | Kasper ........................ 709/213 |

FOREIGN PATENT DOCUMENTS

EP 0537098 4/1993

* cited by examiner

*Primary Examiner*—Doug Hutton
*Assistant Examiner*—Chau Nguyen
(74) *Attorney, Agent, or Firm*—Blakely Sokoloff Taylor & Zafman LLP

(57) ABSTRACT

The invention provides a method and system in which a client/server system uses a NUMA communication link, possibly in combination with a byte serial communication link, to transfer relatively large blocks of data between client and server. The method and system provides for transferring data between the client and server, in which timing for the actual data transfer is decoupled from a request (from the client) or a response (from the server). The method and system also provides for transferring data from either party to the other at mutually agreed locations, such as locations responsive to control information present in either the request or the response. Accordingly, either party can transfer data to the other at a location convenient to both the sender and the recipient, and either party can process data in any order it prefers, without regard for the order in which data is stored at the other party.

38 Claims, 2 Drawing Sheets

COMMUNICATION OF CONTROL INFORMATION AND DATA IN CLIENT/SERVER SYSTEMS

BACKGROUND OF THE INVENTION

1. Field of the Invention

The invention relates to computer communication, such as in client/server systems.

2. Related Art

One known model for assigning or performing tasks in a computer system is a client/server model. In a client/server model, clients make requests for service (by sending messages) to a server; the server responds to those requests for service by providing services to requesting clients (and possibly sending messages back to requesting clients). For example, the server might include a file server responsive to file system requests, a web server responsive to network object requests, a database server responsive to database requests, or some other type of server. Client/server models are used both internally within a single device (the client and server are different software modules), as well as between different devices (the client and server are coupled by a communication link).

When the client and server are different devices, they communicate using a communication link. In byte serial systems, messages between devices are sent and received using a communication protocol. Each message has prepended header information indicating its intended recipient, payload information, and appended checksum information. The sender thus wraps the message inside a serial byte stream, which the receiver unwraps to determine what the message is. Often, the communication protocol will be multi-layered—a lower-level protocol carries multiple types of messages, while different higher-level protocols carry messages suited to particular purposes. Thus, higher-level protocol messages package communication between the client and server, while lower-level protocol messages break up the higher-level protocol messages and package portions of it for sending between devices.

While byte serial models are designed for a very open and diverse environment, they are not well suited to rapid communication of relatively large blocks of data. First, relatively large blocks of data must generally be broken up by the sender into smaller messages, so as to accommodate the message sizes of intermediate communication links. Similarly, the smaller messages must be reassembled at the receiver into the relatively larger blocks of data; this is called fragmentation and reassembly. Second, payload information is not reliably located at any aligned location when received; this causes the receiver to move the payload information into a buffer where the block of data is aligned at a known position. Third, checksum information is computed by the sender and checked by the receiver for each message; this produces substantial computing overhead for each message and for each block of data. Fourth, the receiver must generally be prepared to receive messages of up to the largest possible size; this causes the receiver to allocate maximum size buffers, which are often larger than necessary.

Another known method for communicating data includes DMA (direct memory access) transfer of data between devices. One such method of DMA transfer is known as NUMA (non-uniform memory access); examples of NUMA architectures include Infiniband, ServerNet and interconnection networks compliant with the VI (Virtual Interface) architecture standard such as cLan, Servernet II, and FC-VI. Using a DMA transfer, the initiating device transfers data directly to or from a memory for the target device. The specific memory locations on the target device are specified by the initiator using addresses associated with addresses on the target device. While NUMA architectures are well suited to rapid communication of relatively large blocks of data, they are not generally designed to support high latency wide area networks or to support networks in which export of memory is problematic for security reasons. NUMA architectures are best suited to communication between devices that are closely coupled, both using hardware (relatively short haul communication links) and software (relatively closely cooperating system elements).

One system has used NUMA architecture for communication in a client/server architecture. The Microsoft "Winsock Direct Path" sends messages between client and server using both a TCP/IP communication link and a NUMA communication link. The Winsock Direct Path architecture, after wrapping the message for communication between the sender and the receiver, determines if there is a NUMA communication link available; if so, the Winsock Direct Path architecture uses that NUMA communication link to send the message; if not, the Winsock Direct Path architecture uses the TCP/IP communication link. While the system has some of the advantages of communication using a NUMA architecture, it still has the drawbacks noted earlier for byte serial models of communication in a client/server architecture.

Accordingly, it would be advantageous to provide a technique involving computer communication systems, such as those using a client/server model, that is not subject to drawbacks of the known art.

SUMMARY OF THE INVENTION

The invention provides a method and system in which a client/server system uses a NUMA communication link, possibly in combination with a byte serial communication link, to transfer relatively large blocks of data between client and server. The method and system provides for transferring data between the client and server, in which timing for the actual data transfer is decoupled from a request (from the client) or a response (from the server). The method and system also provides for transferring data from either party to the other at mutually agreed locations, such as locations responsive to control information present in either the request or the response. Accordingly, either party can transfer data to the other at a location convenient to both the sender and the recipient, and either party can process data in any order it prefers, without regard for the order in which data is stored at the other party.

DETAILED DESCRIPTION OF THE PREFERRED EMBODIMENT

System Elements

Figure 1:
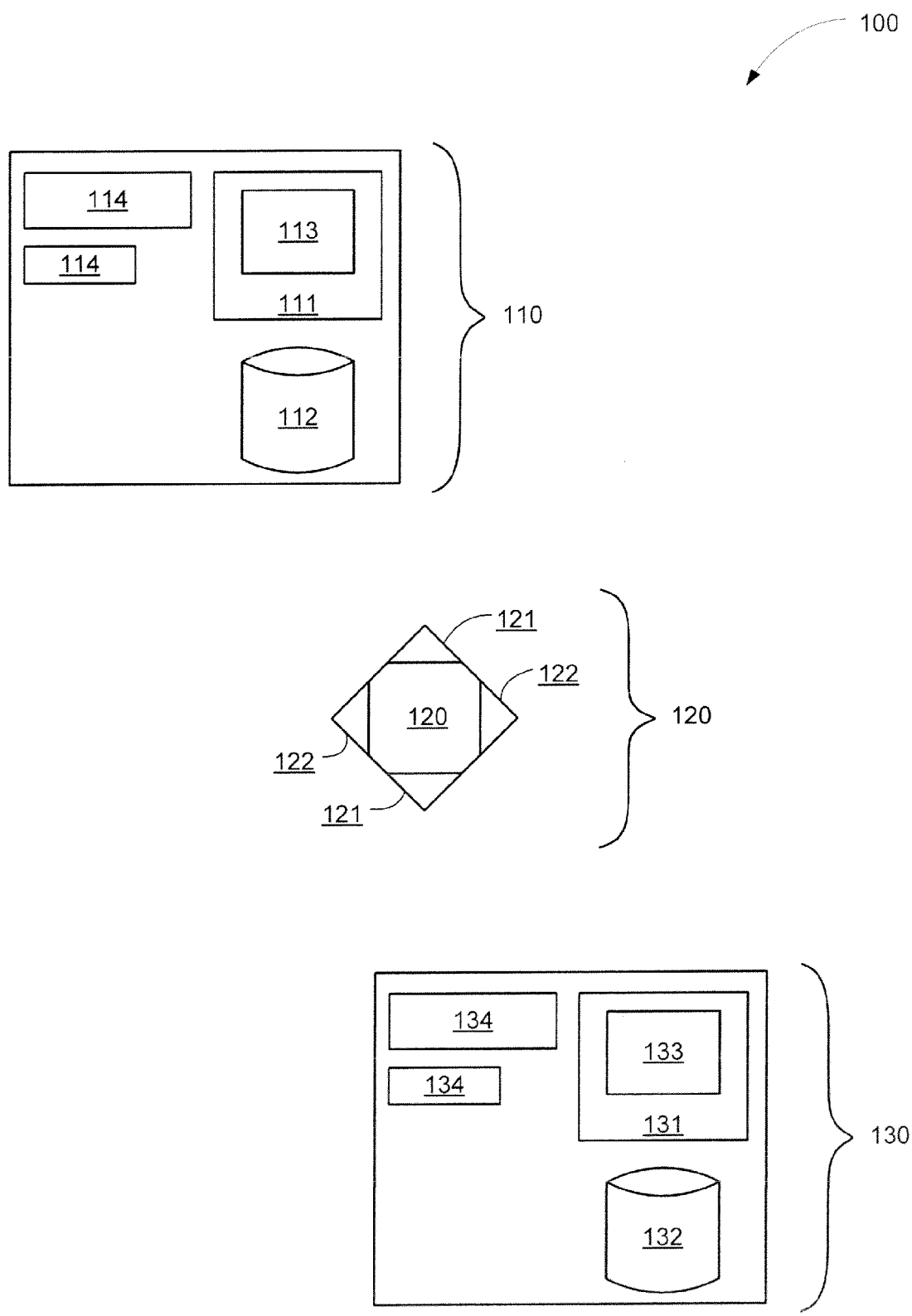
FIG. 1 shows a block diagram of a client/server system using a NUMA communication link.
Figure 2:
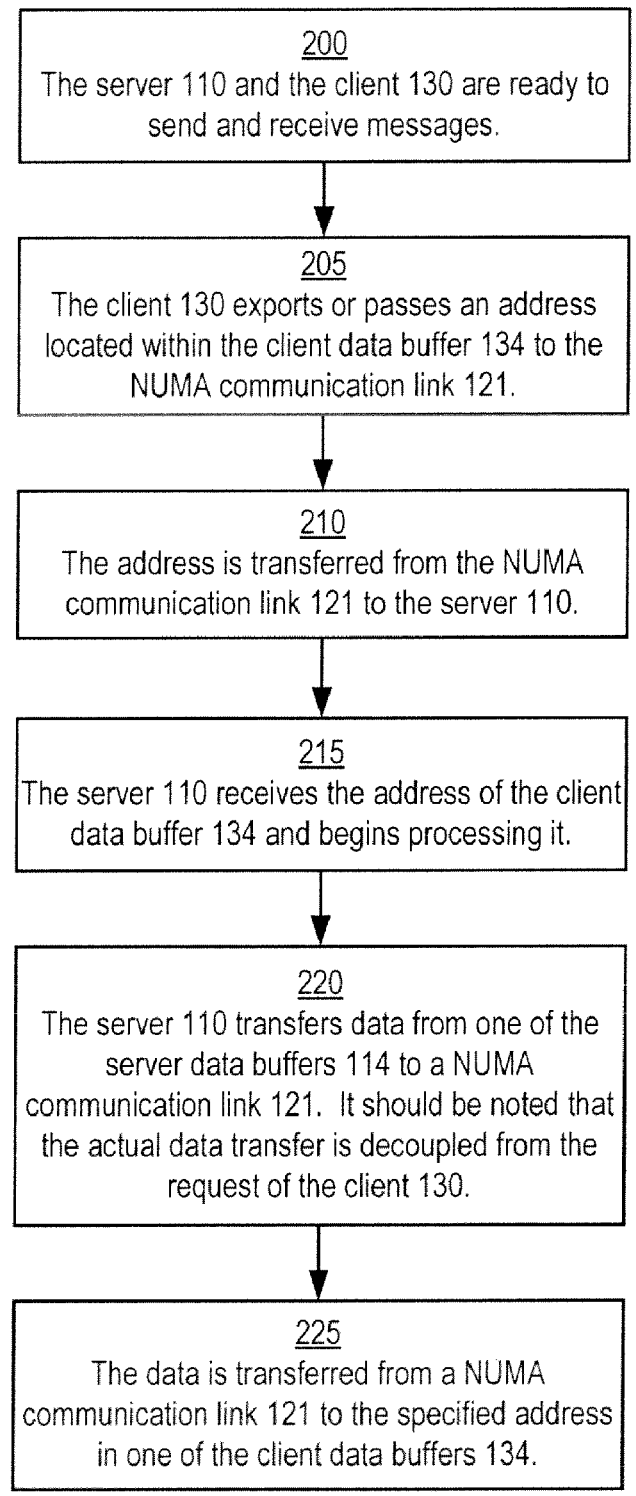
FIG. 2 shows a process flow diagram of a method of using a system as in FIG. 1.

FIG. 1 shows a block diagram of a client/server system using a NUMA communication link.

A system 100 includes a server 110, a communication link 120, and one or more clients 130.

The server 110 includes a processor, server program and data memory 111, and server mass storage 112. The server memory 111 includes server software 113, including instructions for receiving requests from clients 130 and providing responses to clients 130, and server data buffers 114, including locations for receiving information from clients 130 and for recording information for access by clients 130.

The server data buffers 114 are matched to the size of data blocks to be transferred into or out of those server data buffers 114. Accordingly, a first set of server data buffers 114 are relatively larger (such as about 4 Kbytes), so as to accommodate relatively larger data blocks such as disk blocks. A second set of server data buffers 114 are relatively smaller (such as about 256 bytes), so as to accommodate relatively smaller data blocks such as control information. As described in detail below, control information can include memory addresses (either at the server 110 or at the client 130), client/server requests or responses, status information, checksums, or other information for communication between client 130 and server 110 that is relatively smaller than a disk block.

Although this application describes the preferred embodiment as having one server 110, this description is for simplicity only. An embodiment of the system may include more than one server 110, which may each communicate with more than one client 130. The set of servers 110 serving a first client 130 can overlap with the set of servers serving a second client 130; similarly, the set of clients 130 being served by the first server 110 can overlap with the set of clients being served by a second server 110. Moreover, servers 110 can communicate with each other, and clients 130 can communicate with each other, including using techniques described herein with regard to client/server communication.

The communication link 120 includes one or more NUMA communication links 121. In an alternative embodiment, the communication link 120 might also include one or more byte serial communication links 122; however, these adjunct byte serial communication links 122 are not required.

The NUMA communication links 121 allow clients 130 and servers 110 to read or write directly into each other's memory 131 or memory 111, using DMA memory read and write operations. Thus, the server 110 can read or write directly into or out of client memory 131, or clients 130 can read or write directly into or out of server memory 111. There is no particular requirement regarding which locations in the client memory 131 or server memory the client 130 or server 110 can read or write directly into or out of. Target addresses may have to be explicitly exported before they are remotely accessible; however in a preferred embodiment, server 110 does not export memory.

In an alternative embodiment, the byte serial communication links 122 allow clients 130 and servers 110 to send and receive messages 140 to each other. As noted earlier, these adjunct byte serial communications links 122 are not required.

Similar to the server 110, each client 130 includes a processor, client program and data memory 131, and client mass storage 132. The client memory 131 includes client software 133, including instructions for presenting requests to the server 110 and receiving responses from server 110, and client data buffers 134, including locations for receiving information from server 110 and for recording information for access by the server 110.

Similar to the server 110, the client data buffers 134 are matched to the size of data blocks to be transferred into or out of those client data buffers 134. Accordingly, a first set of client data buffers 134 are relatively larger (such as about 4 Kbytes), so as to accommodate relatively larger data blocks such as disk blocks. A second set of client data buffers 134 are relatively smaller (such as about 256 bytes), so as to accommodate relatively smaller data blocks such as control information. These sets of client data buffers 134 need not be the same size as those of the server 110. The sizes indicated are purely illustrative and in no way limiting.

Requests from the client 130 includes addresses within client buffer 134 where results of a read request or a write request should be directed from the server buffer 114.

Method of Use

A method 200 is performed by the system 100. Although the method 200 is described serially, the steps of the method 200 can be performed by separate elements in conjunction or in parallel, whether asynchronously, in a pipelined manner, or otherwise. Lastly, there is no particular requirement that the method 200 be performed in the same order in which this description lists the steps, except where so indicated.

At a flow point 200, the system 100 ready to begin performing a method 200. The server 110 and the client 130 are ready to send and receive messages.

Request from the Client

At a step 205, the client 130 exports or passes an address located within the client data buffer 134 to the NUMA communication link 121. This address allows computing resources to be used most efficiently because the server 110 can direct it's response to the request in such a way as to make optimal use of the space available in the client data buffer 134. The address of the client data buffer 134 is responsive to the relative size of the data block that will be transferred.

If the request is a read request, a client 130 might pass an address of the client data buffer 134 that should receive the results of a read. If the request is a write request, the client 130 might pass the specific address of the client data buffer 134 that should contain data to be written.

In a step 210, the address is transferred from the NUMA communication link 121 to the server 110.

Response of the Server

At a step 215, the server 110 receives the address of the client data buffer 134 and begins processing it.

At a step 220, the server 110 transfers data from one of the server data buffers 114 to a NUMA communication link 121. It should be noted that the actual data transfer is decoupled from the request of the client 130.

At a step 225, the data is transferred using the NUMA communication link 121 to the specified address in one of the client data buffers 134. If the client request was a read request, the data is transferred from the NUMA communication to the specified address of the client data buffer 134. If the client request was a write request, the server 110 reads the data located at the specified address at a client data buffer 134. In a preferred embodiment, the client data buffers 134 are of different sizes and alignments than the server data buffers 114.

The data transfer can be asynchronous; processing of data can occur in any order that is particularly convenient to the server 110 and client 130 as long as the transfer of the data is responsive to the request.

ALTERNATIVE EMBODIMENTS

Although preferred embodiments are disclosed herein, many variations are possible which remain within the concept, scope, and spirit of the invention, and these variations would become clear to those skilled in the art after perusal of this application.

GENERALITY OF THE INVENTION

The invention has general applicability to various fields of use, not necessarily related to e-commerce as described above. For example, these fields of use can include one or more of, or some combination of, the following:

- sending requests from a client device to a database server and transferring data from the database server to a client device in response to the request
- sending requests from a client device to a mail server and transferring data from a mail server to a client device in response to the request
- sending requests from a client device to a cache or proxy server and transferring data from a cache server to a client device in response to the request
- sending requests from a client device to a web server (HTTP) and transferring data from a web server (HTTP) to the client device in response to the request
- sending requests from a client device to an FFT server and transferring bulk data from the FFT server to the client device in response to the request.

The invention claimed is:

1. A method of sending data between a client and a server using at least one of a first plurality of data buffers of different sizes in said client and at least one of a second plurality of data buffers of different sizes in said server, wherein at least some of said first plurality of data buffers are matched to different sizes of the second plurality data buffers, the method comprising steps of:

sending, from said client to said server, an address of a client data buffer of said first plurality of data buffers, wherein said client data buffer is for a data transfer to be performed and said address of said client data buffer is responsive to a size of a data block to be transferred; and transferring said data block between said client and said server using said client data buffer and a server data buffer of said second plurality of data buffers, said client data buffer and said server data buffer matched to a size of data blocks to be transferred between said client and said server.

2. A method as in claim 1, wherein
a request or a response for transferring said data includes at least some control information; and
said steps of transferring said data are responsive to said control information.

3. A method as in claim 1, wherein
a request or a response for transferring said data includes at least one memory address;
said steps of sending said data blocks are responsive to said memory address, wherein said data is read from or written to a memory in response to said memory address.

4. A method as in claim 1, wherein said data buffers in said client include different sizes and alignments than said data buffers in said server.

5. A method as in claim 1, wherein said transferring is done asynchronously with respect to a request that initiated said transferring.

6. A system including
a client and server;
a NUMA communication link coupled to said client and server; and
a first plurality of data buffers of different sizes in said client and a second plurality of data buffers of different sizes in said server, for data transfers between said client and said server using said NUMA communication link, wherein at least some of said first plurality of data buffers are matched to different sizes of the second plurality data buffers;
wherein when data is transferred between said client and said server, an address of a client data buffer of said first plurality of data buffers is sent from said client to said server, with said address of said client data buffer for a data transfer responsive to a size of a data block to be transferred, and said client data buffer and a server data buffer of said second plurality of data buffers are used to transfer said data block, with said client data buffer and said server data buffer matched to a size of said data block to be transferred between said client and said server.

7. A system as in claim 6, also including a byte serial communication link, wherein transferring said data also uses said byte serial communication link.

8. A system as in claim 6, wherein
either said client or server performs processing of information in transferring said data;
said processing is performed in an order
which is decoupled from an order of transferring said data.

9. A system as in claim 6, wherein transferring said data is responsive to control information in a request or a response for said data transfer.

10. A system as in claim 6, wherein transferring said data is responsive to a request or a response for said data transfer.

11. A system as in claim 6, wherein said one or more data buffers also is selected responsive to control information in a request or a response for transferring said data.

12. A system as in claim 6, wherein said data buffers in said client include different sizes and alignments than said data buffers in said server.

13. A method as in claim 6, wherein said data transfer is done asynchronously with respect to a request that initiated said transfer.

14. A system comprising:
a server, said server having a memory including a client communication region and a data transfer region, said data transfer region having a first plurality of data buffers of different sizes for data transfers to and from a client, at least some of said first plurality of data buffers matched to different sizes of data blocks to be transferred into or out of those data buffers and matched to different sizes of a second plurality data buffers in said client that are also matched to said different sizes of said data blocks to be transferred; and
a remote DMA communication link coupled to said data transfer region;
wherein said client communication region includes information regarding a data transfer into or out of said data transfer region; and
wherein an address of one or more of said first plurality of data buffers for said data transfer is selected for a data transfer responsive to a size of data blocks for said data transfer.

15. A system as in claim 14, including a byte serial communication link coupled to said client communication region.

16. A system as in claim 14, including a processing element in said server coupled to said data transfer region, said processing element responsive to a request from a client or a response to a client.

17. A system as in claim 14, including a processing element in said server coupled to said data transfer region, said processing element responsive to control information in said client communication region.

18. A system as in claim 14, including a processing element in said server coupled to said data transfer region, said processing element using information in said data transfer region independently of said remote DMA communication link.

19. A system as in claim 14, including a request from a client or a response to said client having information regarding a location within data transfer region.

20. A system as in claim 14, wherein said client communication region stores a request from a client or a response to said client.

21. A system as in claim 14, wherein said data transfer region stores a data transfer to or from a client.

22. A system as in claim 14, wherein said remote DMA communication link includes a NUMA communication link.

23. A system as in claim 14, wherein said data buffers in said client include different sizes and alignments than said data buffers in said server.

24. A method as in claim 14, wherein said data transfer is done asynchronously with respect to a request that initiated said transfer.

25. A method comprising:
communicating a file system request between a client and a file server; and
sending data between said client and said file server in response to the request, by using a non-uniform memory access (NUMA) communication link to perform a direct memory access (DMA) operation involving at least one of a plurality of data buffers of different sizes both in said client and in said file server, wherein at least some of said data buffers both in said client and in said file server are matched to sizes of data blocks to be transferred into or out of said data buffers, wherein at least some of said data buffers in said client are matched to different sizes of data buffers in said file server, and wherein selection of an address of one or more of said data buffers for a data transfer is responsive to information in said request or a response to said request and is responsive to a size of data blocks to be transferred in said DMA operation.

26. A method as in claim 25, wherein said memory access operation includes a remote DMA operation.

27. A method as in claim 25, wherein said client includes a database server.

28. A method as in claim 25, wherein said data buffers in said client include different sizes and alignments than said data buffers in said file server.

29. A method as in claim 25, wherein said sending data is done asynchronously with respect to said request.

30. A method comprising:
communicating a database request between a client and a database server; and
sending data between said client and said database server in response to the request, by using a non-uniform memory access (NUMA) communication link to perform a direct memory access (DMA) operation involving at least one of a plurality data buffers of different sizes both in said client and in said database server, wherein at least some of said data buffers both in said client and in said database server are matched to sizes of data blocks to be transferred into or out of said data buffers, wherein at least some of said data buffers in said client are matched to different sizes of data buffers in said database server, and wherein selection of an address for one or more of said data buffers for a data transfer is responsive to information in said request or a response to said request and is responsive to a size of data blocks to be transferred in said DMA operation.

31. A method as in claim 30, wherein said data buffers in said client include different sizes and alignments than said data buffers in said database server.

32. A method as in claim 30, wherein said sending data is done asynchronously with respect to said request.

33. A method comprising:
communicating a request between a client and a cache server; and
sending data between said client and said cache server in response to the request, by using a non-uniform memory access (NUMA) communication link to perform a direct memory access (DMA) operation involving at least one of a plurality of data buffers of different sizes both in said client and in said cache server, wherein at least some of said data buffers both in said client and in said cache server are matched to sizes of data blocks to be transferred into or out of said data buffers, wherein at least some of said data buffers in said client are matched to different sizes of data buffers in said cache server, and wherein selection of an address for one or more of said data buffers for a data transfer is responsive to information in said request or a response to said request and is responsive to a size of data blocks to be transferred in said DMA operation.

34. A method as in claim 33, wherein said data buffers in said client include different sizes and alignments than said data buffers in said cache server.

35. A method as in claim 33, wherein said sending data is done asynchronously with respect to said request.

36. A method comprising:
communicating a request between a client and a web server; and
sending data between said client and said web server in response to the request, by using a non-uniform memory access (NUMA) communication link to perform a direct memory access (DMA) operation involving at least one of a plurality of data buffers of different sizes both in said client and in said web server, wherein at least some of said data buffers both in said client and in said web server are matched to sizes of data blocks to be transferred into or out of said data buffers, wherein at least some of said data buffers in said client are matched to different sizes of data buffers in said web server, and wherein selection of an address for one or more of said data buffers for a data transfer is responsive to information in said request or a response to said request and is responsive to a size of data blocks to be transferred in said DMA operation.

37. A method as in claim 36, wherein said data buffers in said client include different sizes and alignments than said data buffers in said web server.

38. A method as in claim 36, wherein said sending data is done asynchronously with respect to said request.

* * * * *